(12) United States Patent
Kawamoto et al.

(10) Patent No.: US 6,796,785 B2
(45) Date of Patent: Sep. 28, 2004

(54) HOLLOW ARTICLE MADE OF THERMOPLASTIC RESIN, MANUFACTURING METHOD OF THE HOLLOW ARTICLE, AND MANUFACTURING APPARATUS OF THE HOLLOW ARTICLE

(75) Inventors: Taro Kawamoto, Ageo (JP); Kazuhiko Sueoka, Ageo (JP); Yasuji Takada, Ageo (JP)

(73) Assignee: Fukoku Co., Ltd., Saitama-ken (JP)

( * ) Notice: Subject to any disclaimer, the term of this patent is extended or adjusted under 35 U.S.C. 154(b) by 24 days.

(21) Appl. No.: 10/151,149

(22) Filed: May 21, 2002

(65) Prior Publication Data

US 2002/0182355 A1 Dec. 5, 2002

(30) Foreign Application Priority Data

Jun. 1, 2001 (JP) ........................................ 2001-167336

(51) Int. Cl.[7] .......................... B29C 49/04; B29C 49/06; B29C 49/10
(52) U.S. Cl. ........................ 425/529; 264/539; 425/532; 425/533
(58) Field of Search ................................. 425/532, 533, 425/528, 529, 526; 264/539

(56) References Cited

U.S. PATENT DOCUMENTS

| | | | | | |
|---|---|---|---|---|---|
| 2,966,702 | A | * | 1/1961 | Soubier | 425/532 |
| 3,394,209 | A | * | 7/1968 | Cheney | 264/539 |
| 4,204,826 | A | * | 5/1980 | Mehnert | 425/532 |
| 5,330,342 | A | | 7/1994 | Linss et al. | 425/532 |

FOREIGN PATENT DOCUMENTS

JP          10272679         10/1998

* cited by examiner

Primary Examiner—Robert B. Davis
(74) Attorney, Agent, or Firm—Jacobson Holman PLLC (57) ABSTRACT

An apparatus for manufacture of a hollow article having a configuration in which the wall thickness of each of both end portions changes multidirectionally with extremely high accuracy. The apparatus includes an annular orifice nozzle including a nozzle core and a nozzle mouthpiece. The nozzle mouthpiece is multi-divided vertically and laterally, and the divided part is disposed so as to be able to reciprocate laterally. A part of the upper portion of the nozzle mouthpiece is replaced with a blow mold and a lower portion can be moved laterally upon taking out a product.

3 Claims, 7 Drawing Sheets

(PRIOR ART)

FIG. 7

(PRIOR ART)

HOLLOW ARTICLE MADE OF THERMOPLASTIC RESIN, MANUFACTURING METHOD OF THE HOLLOW ARTICLE, AND MANUFACTURING APPARATUS OF THE HOLLOW ARTICLE

BACKGROUND OF THE INVENTION (i) Field of the Invention

The present invention relates to a hollow article made of a thermoplastic resin and having both end portions whose wall thickness changes multidirectionally with extremely high accuracy, such as tri-port type CV-joint boots for automobiles.

(ii) Description of the Related Art

Figure 6:
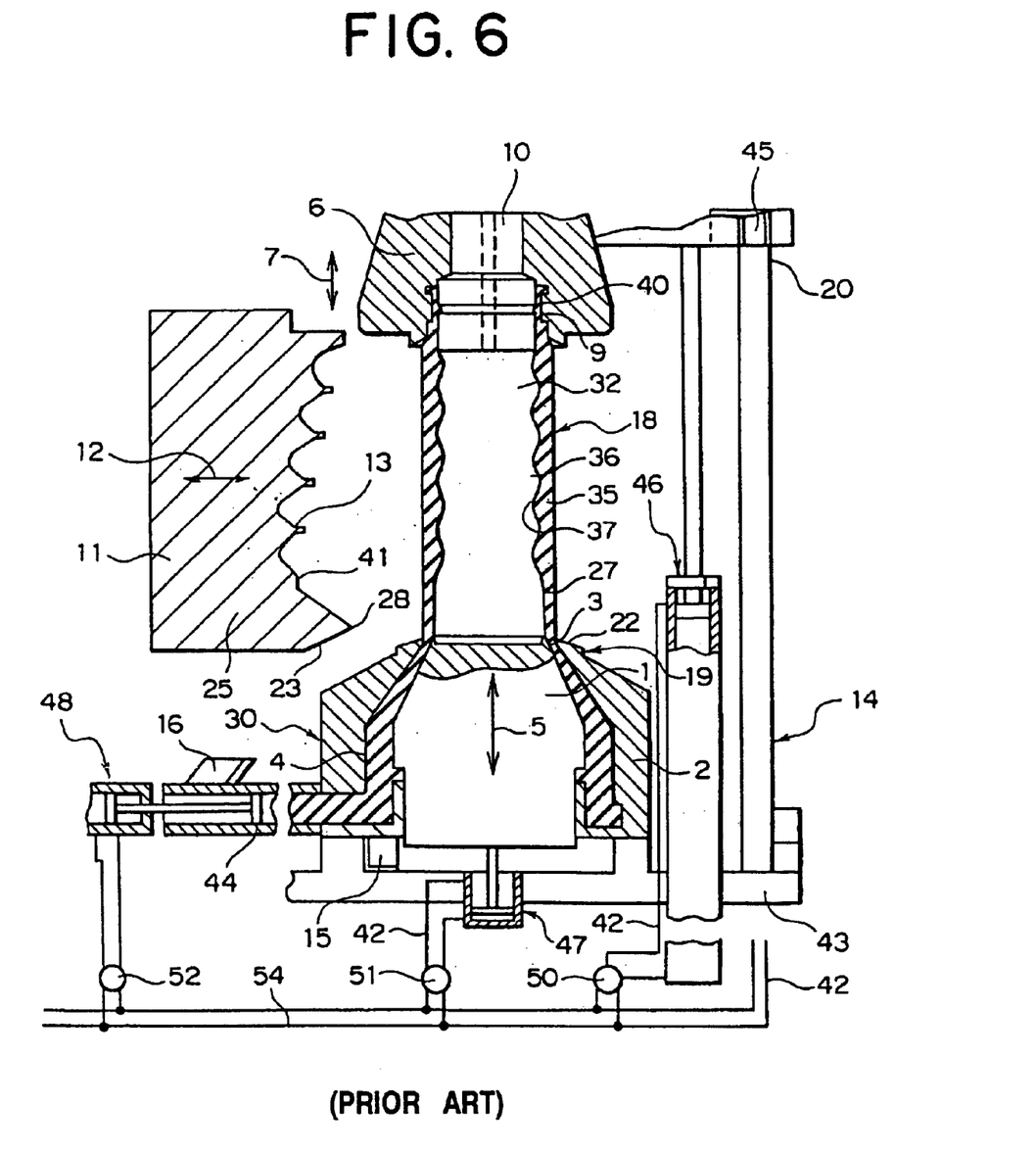
FIG. 6 is a sectional view of a prior art for blow-molding bellows.
Figure 7:
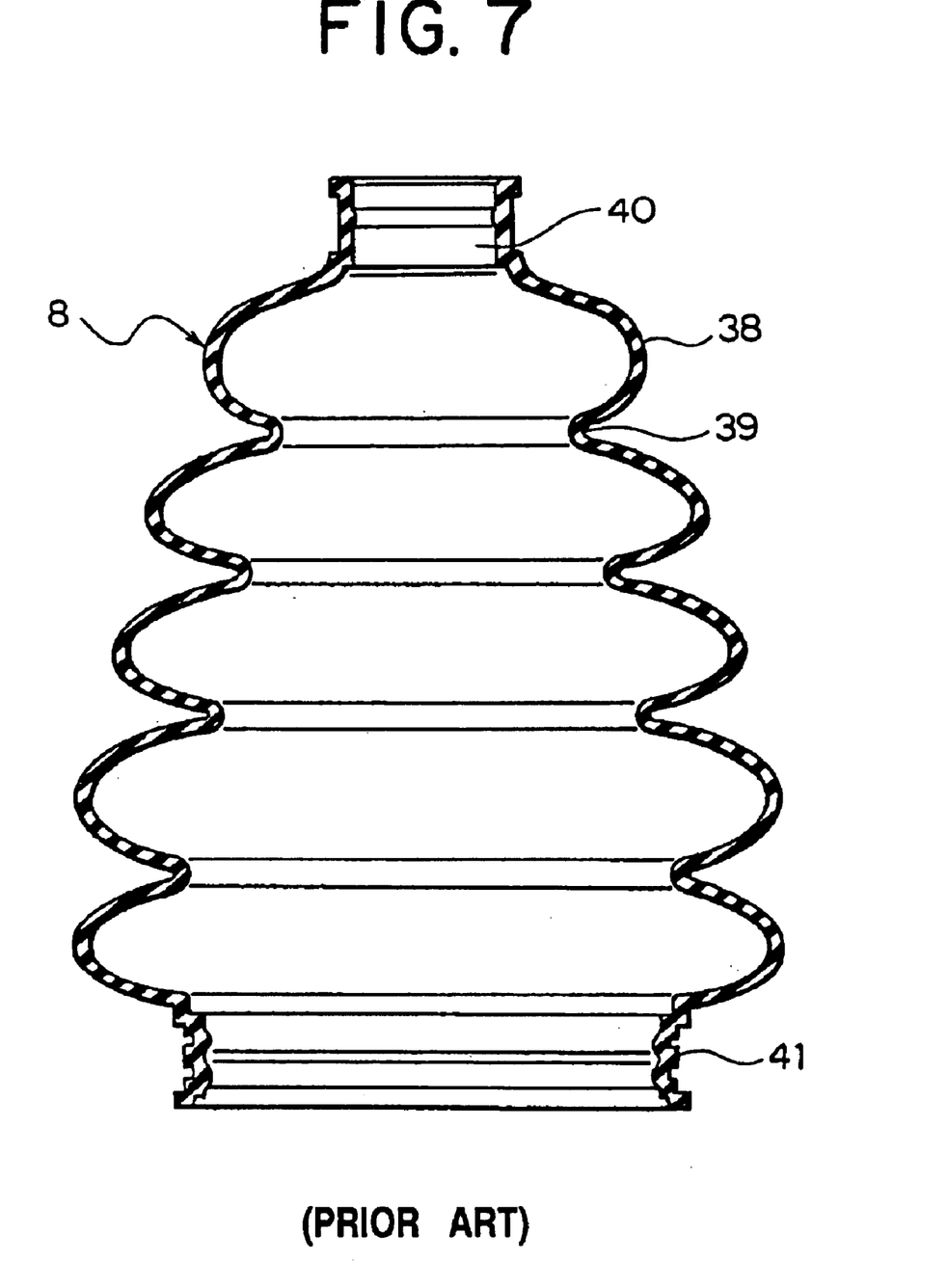
FIG. 7 is a sectional view of bellows manufactured with the parison manufacturing apparatus illustrated in FIG. 6.

Conventionally, as illustrated in FIG. 7 for example, a hollow article 8 such as a CV-joint boot for an automobile is known. In the CV-joint boot 8, one end portion (the upper end portion in FIG. 7) 40 has been formed by injection molding and all other portions have been formed by blow molding. As an apparatus for manufacturing such a hollow article 8, an apparatus illustrated in FIG. 6 is known (Japanese Patent No. 2556647).

The apparatus illustrated in FIG. 6 is a parison manufacturing apparatus for blow-molding bellows (hollow article) 8, in which the bellows is blow-molded with its cross-sectional profile being changed into a wave shape through the whole length of a parison 18, as illustrated in FIG. 6. Since the circular parison 18 is never flatly compressed, the plastic is extended evenly throughout the whole periphery. This prior art is very superior for molding such bellows 8. In the bellows molded with this apparatus, since its one end portion (the upper end portion in FIG. 6) 40 is injection-molded with a neck mold, the thickness of that portion can be changed multidirectionally on the circumference with high accuracy. In the portion other than the one end portion 40, however, its thickness cannot but be uniform throughout the circumference because it is blow-molded. As a result, the apparatus can provide only such a general automobile CV-joint boot (bellows) 8 as illustrated in FIG. 7. This point is a problem of the prior art, which the present invention is to solve in particular. More specifically, some tri-port type CV-joint boots, for example, may require not only a high dimensional accuracy at the one end portion 40 (the wall thickness must be changed multidirectionally with high accuracy) but also a high dimensional accuracy at the other end portion (the lower end portion in FIG. 6) 41 (the inner circumference must be formed unevenly in height and the outer circumference must be formed into an accurate circle), that is, they may require an accurate shape at either of both end portions of the bellows, whose wall thickness is changed multidirectionally. The above-described prior art, however, has a problem that it can not meet this requirement. Further, in case of a conventional automobile CV-joint boot (FIG. 7) made with a manufacturing apparatus of this kind, the molded portion from the distal end of a nozzle mouthpiece 2 to the other end 41 of the CV-joint boot is an unnecessary portion, and such an unnecessary portion is very large. This brings about a problem that a great deal of waste is generated. On the other hand, Japanese Patent Application Laid-open No. 10-272679 discloses a method in which, upon injection-blow molding, the mold for the final product shape portion (portion corresponding to the other end portion 41 in the above-described prior art) is not changed for injection molding and for blow molding and it is successively molded, and thereby no flash is generated and the dimensional accuracy is kept. By this technique, only the other end portion as the final product shape portion 41 meets the above-described object, but the one end portion (portion corresponding to the one end portion 40 in the above-described prior art) is blow-molded by changing an injection mold and a blow mold with each other. Therefore, even by this technique, a configuration in which the wall thickness at both ends is changed multidirectionally with high accuracy can not be formed. So, as a result of repeating earnest studies and examinations, by improving the manufacturing apparatus of the above-described prior art (Japanese Patent No. 2556647), the present applicant has succeeded in newly developing a hollow article made of a thermoplastic resin and having both end portions whose wall thickness changes multidirectionally with extremely high accuracy, a manufacturing method of the hollow article, and a manufacturing apparatus for the hollow article.

SUMMARY OF THE INVENTION

The present invention has been developed in view of such problems of the prior art, and its object is to provide a hollow article made of a thermoplastic resin and having both end portions whose wall thickness changes multidirectionally with extremely high accuracy.

Technical measures made by the present invention to solve the above problems are as follows. A hollow article made of a thermoplastic resin is formed by bringing a cavity of a drawing unit into contact with an outlet gap of an annular orifice nozzle made up of a nozzle core constituted so as to be upwardly and downwardly movable, and a nozzle mouthpiece concentrically surrounding said core to form said outlet gap having a variable gap width for upward extruding the thermoplastic resin between it and said core; injecting the thermoplastic resin into said cavity through said outlet gap to form one end portion having a configuration in which a wall thickness changes multidirectionally with extremely high accuracy; drawing and forming a tubular parison while moving said drawing unit apart from said annular orifice; blow-molding the tubular parison after replacing an uppermost portion of said nozzle mouthpiece constituting said outlet gap with a blow mold to form a hollow article body; injection-molding the other end portion of a hollow article having a configuration in which a wall thickness changes multidirectionally with extremely high accuracy, through a cavity having a desired shape of said nozzle mouthpiece at a lower portion; and laterally moving said blow mold and said nozzle mouthpiece upon taking out a product to open them. A typical example of the hollow article is a tri-port type CV-joint boot for an automobile.

A manufacturing apparatus for the hollow article is as follows.

The apparatus comprises an annular orifice nozzle made up of a nozzle core constituted so as to be upwardly and downwardly movable, and a nozzle mouthpiece concentrically surrounding said core to form an outlet gap having a variable gap width for upward extruding a thermoplastic resin between it and said core; a drawing unit having a cavity of a desired shape downward opened for forming one end portion of a hollow article, said drawing unit being moved apart from said annular orifice nozzle to draw and form a tubular parison after injecting the thermoplastic resin into said cavity on said outlet gap of said annular orifice nozzle; and a blow mold for blow-molding said tubular parison to form a hollow article body of a desired shape, wherein said nozzle mouthpiece is multi-divided vertically and laterally, each divided part is disposed so as to be able to reciprocate laterally, an uppermost portion of said nozzle mouthpiece divided is constituted so as to be replaceable with said blow mold upon blow molding, and a lower portion of said nozzle mouthpiece has a desired cavity and said blow mold and said nozzle mouthpiece can be moved laterally upon taking out a product after forming the other end portion of the hollow article into a desired shape to open them. The above nozzle mouthpiece is divided into at least a portion for forming the outlet gap, and a portion for injection-molding the other end portion of the hollow article having a configuration in which a wall thickness changes multidirectionally with extremely high accuracy.

The nozzle mouthpiece multi-divided vertically and laterally can have an individual independent temperature conditioning system to set the thermoplastic resin in the nozzle mouthpiece at a proper temperature any time.

A manufacturing method of the above hollow article comprises the steps of bringing a cavity of a drawing unit into contact with an outlet gap of an annular orifice nozzle made up of a nozzle core constituted so as to be upwardly and downwardly movable, and a nozzle mouthpiece concentrically surrounding said core to form said outlet gap having a variable gap width for upward extruding a thermoplastic resin between it and said core; injecting the thermoplastic resin into said cavity through said outlet gap to form one end portion having a configuration in which a wall thickness changes multidirectionally with extremely high accuracy; drawing and forming a tubular parison while moving said drawing unit apart from said annular orifice; blow-molding the tubular parison after replacing an uppermost portion of said nozzle mouthpiece constituting said outlet gap with a blow mold to form a hollow article body; injection-molding the other end portion of a hollow article having a configuration in which a wall thickness changes multidirectionally with extremely high accuracy, with a cavity having a desired shape at a lower portion of said nozzle mouthpiece; and then laterally moving said blow mold and said nozzle mouthpiece upon taking out a product to open them, thereby forming a hollow article having both end portions whose wall thickness changes multidirectionally with extremely high accuracy.

In the present invention, the shape of the one end portion is determined by the cavity shape of the neck mold. On the other hand, the shape of the other end portion is determined by that the cavity (space shape) defined by the nozzle mouthpiece of the annular orifice nozzle and the outer side surface of the nozzle core serves as a flow passage for the thermoplastic resin when pushing into the neck mold and when extruding the parison, and keeps the thermoplastic resin filling up the lower portion of the space shape upon blow molding. At this time, the thermoplastic resin filling up the upper portion of the annular orifice nozzle is expanded to the inner wall surface of the blow mold by compressed gas blown into the parison after part of the upper portion of the nozzle mouthpiece is replaced with the blow mold while keeping the nozzle core intact, and the shapes of the parison and the other end become one continuous body. This makes it possible to manufacture such a hollow article made of a thermoplastic resin and having both end portions whose wall thickness changes multidirectionally with extremely high accuracy. Further, in case of, e.g., an automobile CV-joint boot made with this manufacturing apparatus, in which the outer diameter of the other end is larger than that of the one end, the unnecessary molded portion from the distal end of the nozzle mouthpiece to the other end portion of the CV-joint boot becomes small and there is an advantage that the amount of waste generated becomes very little. Here, the nozzle mouthpiece multi-divided vertically and laterally can have an individual independent temperature conditioning system, and it can be adjusted and set at temperatures at which the thermoplastic resin in the nozzle mouthpiece is made easy to flow upon flowing, easy to blow upon blowing, and solidified at a short time.

The present invention provides not only the manufacturing apparatus of the hollow article but also a method for molding a specific hollow article by manufacturing a specific parison and a specific shape using a specific apparatus. In this respect, the present invention can also make it possible to, for example, first push a thermoplastic resin into a cavity of a neck mold in contact with an annular orifice nozzle for plastic, then form a parison with moving said neck mold apart from said annular orifice nozzle, said parison being a tubular parison having various different cross-sections throughout the whole length of the parison so that the wall thickness of the parison formed may change into a wave shape through troughs and peaks, operate a controller for a drive unit for moving the neck mold onto/apart and a controller for a drive unit for changing plastic flowing out through an outlet gap of said annular orifice nozzle, while moving the neck mold apart from said annular orifice nozzle, said outlet gap of said annular orifice nozzle being changed in accordance with the quantity of the plastic flowing out, increase the speed of said neck mold from zero when moving the neck mold apart from said annular orifice nozzle, and operate both controllers as described above to work in the period when said neck mold is further moving apart. Here, the characteristic features of the present invention are in that the nozzle mouthpiece constituting the annular orifice nozzle is multi-divided vertically and laterally, each divided portion is disposed so as to be able to reciprocate laterally, part of the upper portion of the nozzle mouthpiece is replaced with the blow mold, and further, part lower than that keeps the thermoplastic resin filling up also upon blowing and is made to be able to open and close for taking out a product, and thereby, a hollow article is formed having both end portions whose wall thickness changes multidirectionally with extremely high accuracy.

A hollow article of the present invention can be constructed in consideration of various use objects. Besides, the manufacturing method and the manufacturing apparatus for the hollow article of the present invention are particularly advantageous because they are constructed so that they can manufacture tri-port type CV-joint boots. Such a boot is provided for use on the transmission side of an automobile, and it requires not only a high accuracy in dimension of one end portion but also, in the other end portion, an accurate configuration in which the wall thickness changes multidirectionally, i.e., the profile of the outer periphery must be made into an accurate circle while protrusions are formed on the inner peripheral side. Important points when using it are not only the point that the bellows manufactured according to the present invention is made of a thermoplastic elastomer, but also in that high accurate bellows both end portions can be obtained because it can be manufactured with more accuracy by setting the neck mold, the annular orifice nozzle, and the divided nozzle mouthpiece.

BRIEF DESCRIPTION OF THE DRAWINGS

FIG. 5 is an example of operation conceptional views when a hollow article is manufactured with the manufacturing apparatus for the hollow article illustrated in FIG. 1, in which (a) illustrates a state that a neck mold sits on an annular orifice nozzle, (b) illustrates a state that the neck mold rises from the annular orifice nozzle to start forming a parison, (c) illustrates a state that the neck mold completes the rising operation and the parison has been formed, (d) illustrates a state that a nozzle mouthpiece is divided after forming the parison, (e) illustrates a state that the nozzle mold has been replaced with a blow molding split mold, (f) illustrates a state that the replaced blow molding split mold is closed, (g) illustrates a state that the parison is being blow-molded into the final shape in the blow molding split mold, and (h) illustrates a state that, after completion of blow molding, the blow molding split mold and the nozzle mouthpiece are divided and a product having been blow-molded into the final shape is taken out;

DETAILED DESCRIPTION OF THE PREFERRED EMBODIMENTS

Figure 1:
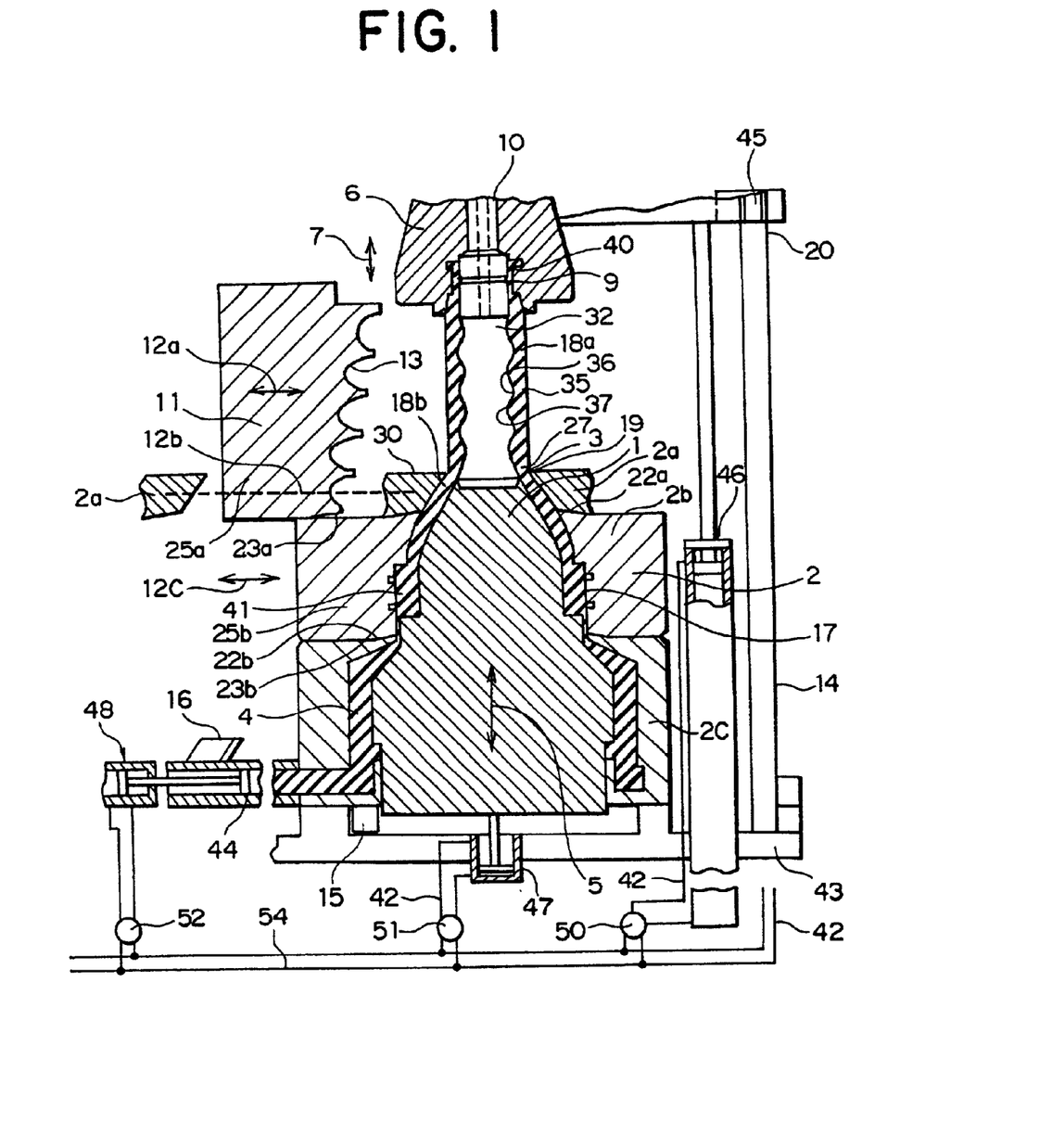
FIG. 1 is a sectional view of a manufacturing apparatus for a hollow article made of a thermoplastic resin according to an embodiment of the present invention.
Figure 2:
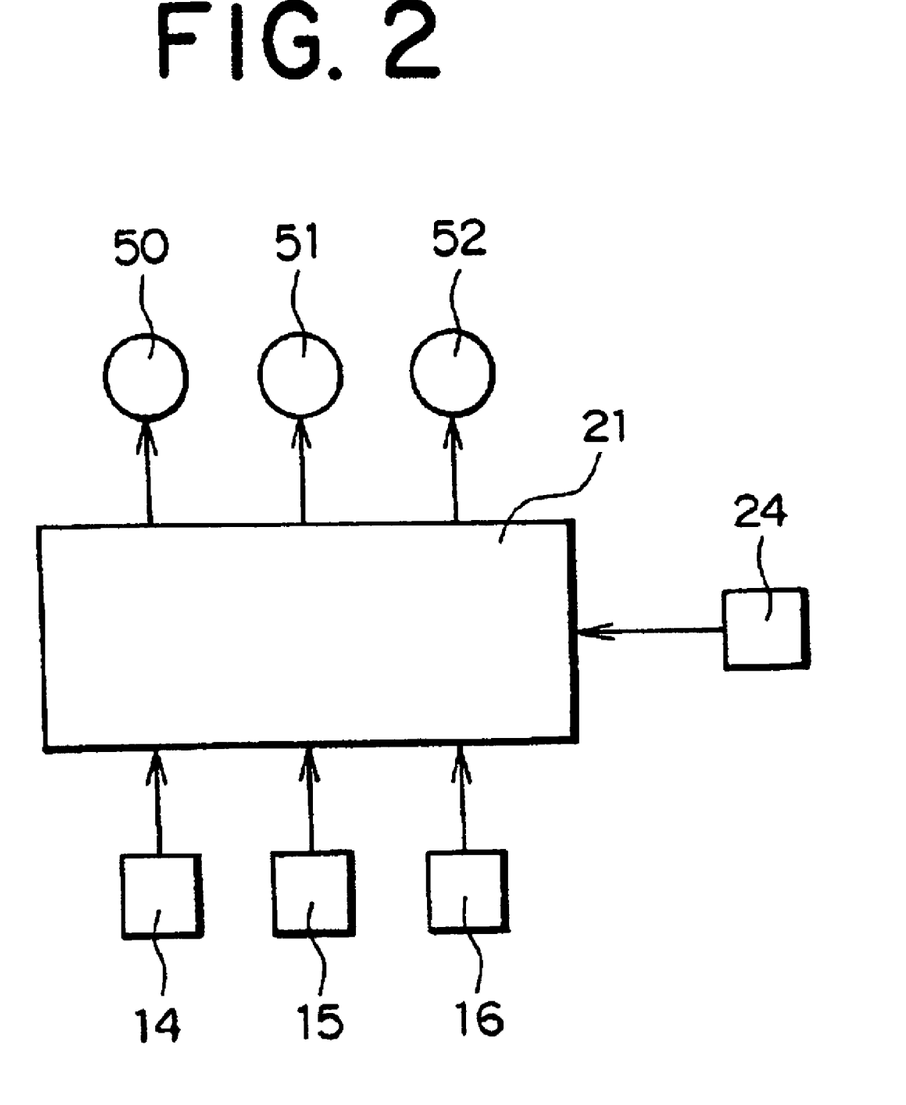
FIG. 2 is a block diagram illustrating the construction of a controller of the hollow article manufacturing apparatus illustrated in FIG. 1.
Figure 3:
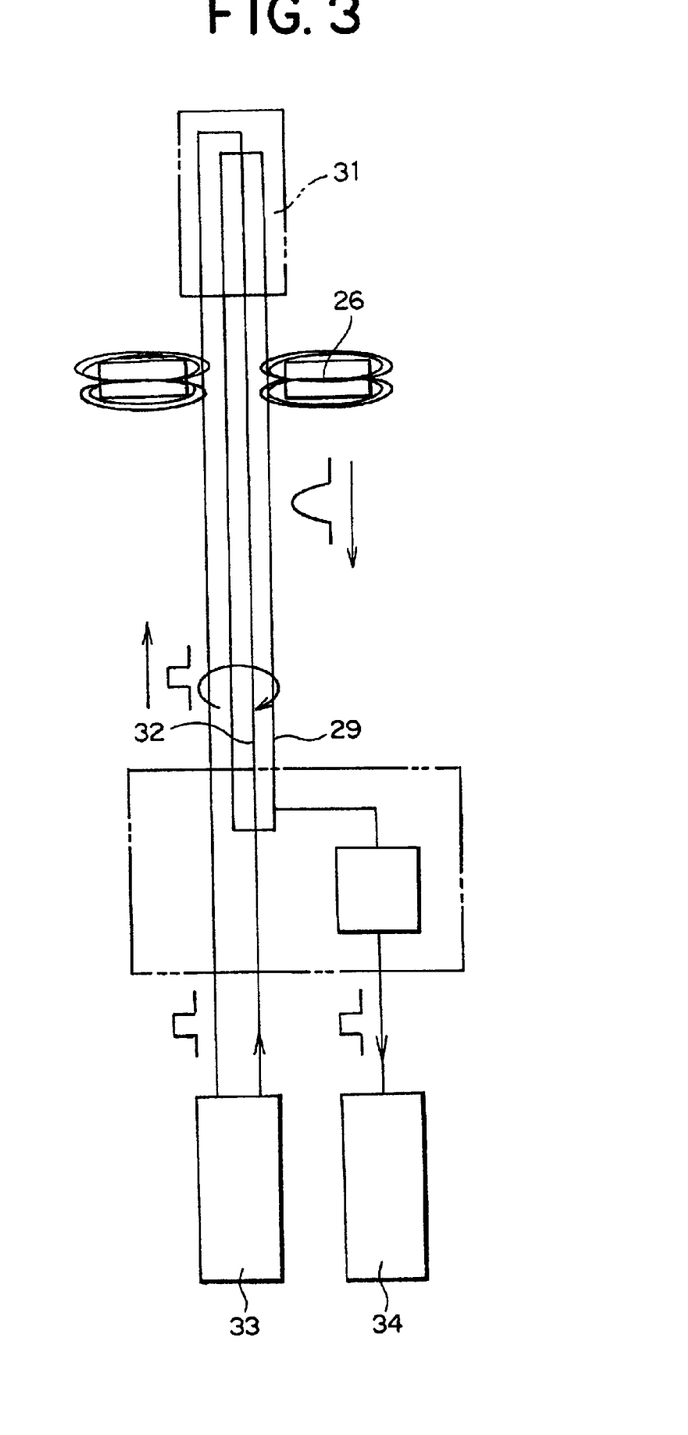
FIG. 3 is a schematic view of a stroke measuring device of the hollow article manufacturing apparatus illustrated in FIG. 1.
Figure 4A:
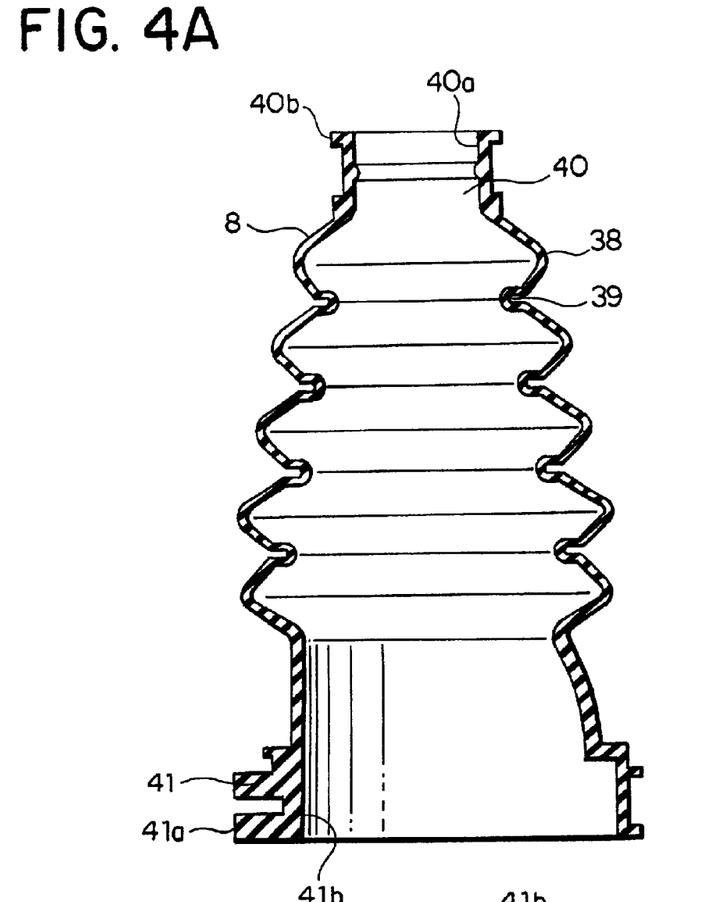
FIGS. 4A and 4B provide a sectional view of bellows (tri-port type CV-joint boot) manufactured with the manufacturing apparatus for the hollow article illustrated in FIG. 1.
Figure 4B:
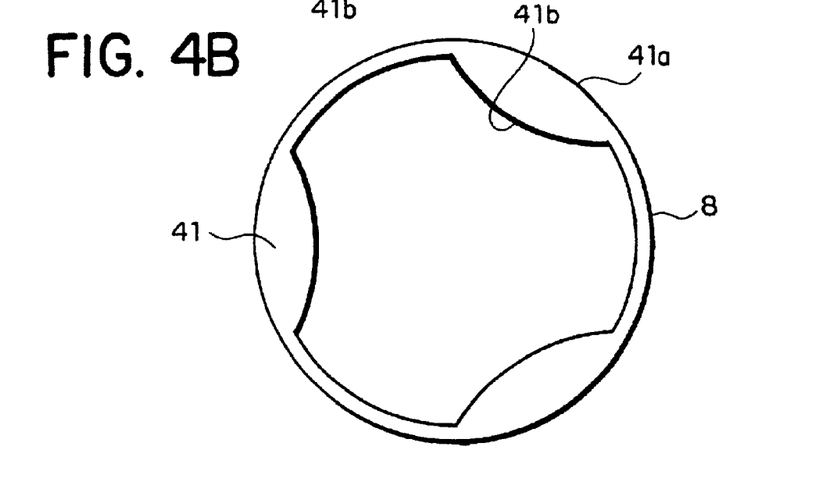
Figure 5A:
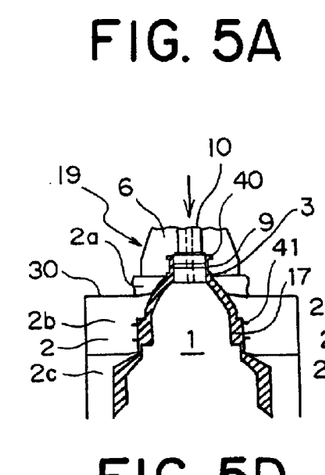
Figures 5B, 5C:
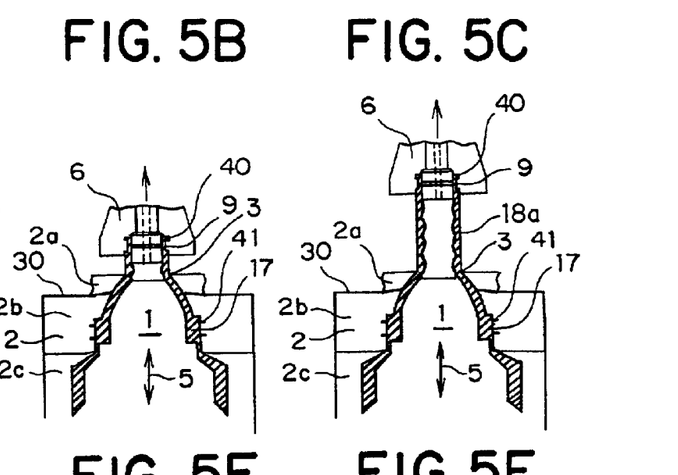
Figures 5D, 5E, 5F:
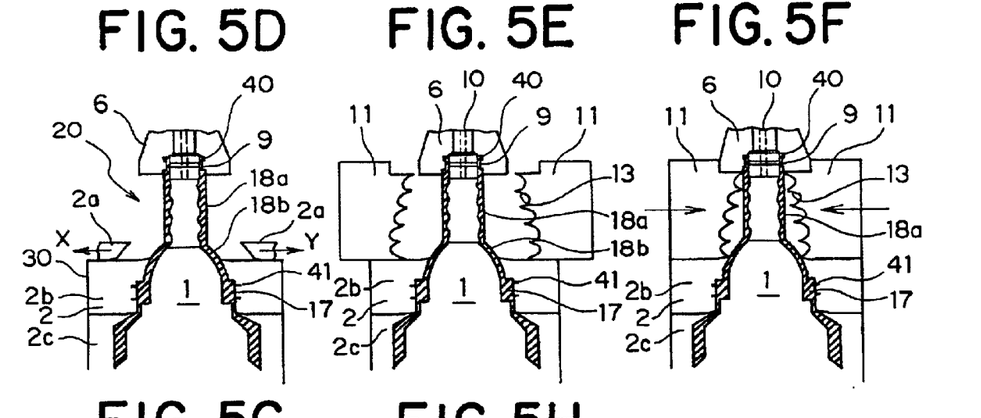
Figure 5G:
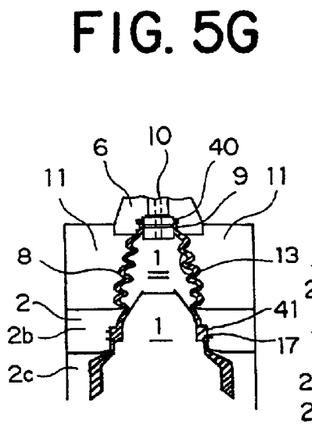
Figure 5H:
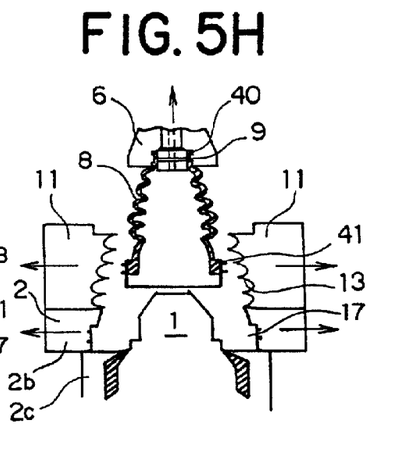

Hereinafter, an embodiment of the present invention will be described with reference to drawings. Note that this embodiment is nothing but an embodiment used for only describing the present invention in detail and the present invention should not be interpreted limitedly to this embodiment. FIG. 1 is a vertical sectional view illustrating an embodiment of a manufacturing apparatus for a hollow article made of a thermoplastic resin according to the present invention, FIG. 2 is a block diagram illustrating the construction of a controller of the manufacturing apparatus for the hollow article, FIG. 3 is a conceptional view of a stroke measuring device, FIG. 4 illustrates an embodiment of the hollow article made of the thermoplastic resin, in which (a) is a vertical sectional view and (b) is a bottom view, and FIG. 5 is a schematic view illustrating steps of a manufacturing method for the hollow article according to the present invention.

A hollow article of the present invention comprises both end portions 40 and 41 each having a constitution in which the wall thickness of these end portions formed by injection molding a thermoplastic resin changes multidirectionally with extremely high accuracy, and a hollow article body (bellows) 8 integrally formed by blow molding between both end portions 40 and 41. A typical example thereof is a tri-port type CV-joint boot for an automobile illustrated in, e.g., FIG. 4 by way of example. Both end portions of the blow-molded bellows as the hollow article body 8, i.e., one end portion 40 as the upper end portion in FIG. 1 and the other end portion 41 as the lower end portion, are each constructed so as to have a configuration in which the wall thickness changes multidirectionally with extremely high accuracy (see FIGS. 4(a) and (b)). For example, in this embodiment illustrated in FIG. 4, the one end portion 40 is formed so that the inner diameter 40a is made into a substantially accurate circle and the outer diameter 40b is made uneven in height on the periphery. On the other hand, the other end portion 41 is formed so that the outer diameter 41a is made into a substantially accurate circle and the inner diameter 41b is made uneven in height on the periphery. Either of both end portions 40 and 41 thus has a configuration in which the wall thickness changes multidirectionally. Although this uneven shape is not particularly limited, since both end portions 40 and 41 are formed by injection molding, a multidirectional change in wall thickness can be obtained with extremely high accuracy. The shape of this hollow article body 8 should not be interpreted limitedly to the illustrated shape. Besides, also either shape of both end portions 40 and 41, i.e., the configuration in which the wall thickness changes multidirectionally, should not be interpreted limitedly to the illustrated shape. They can be changed in design within the scope of the present invention. The thermoplastic resin as the material of the hollow article should not particularly be limitedly interpreted, and the optimum material can properly be selected within the scope of the present invention. Besides, although, in this embodiment, a tri-port type CV-joint boot for an automobile is described as an embodiment of the hollow article, this only shows one optimum embodiment. The hollow article of the present invention should not at all be interpreted limitedly to this, and any other form can properly be selected within the scope of the present invention. That is, it is needless to say that, if both end portions of a hollow article body to be blow-molded are formed by injection molding so that the wall thickness may change multidirectionally, the present invention is applicable to a product in a field not having any relation to the joint boot of this embodiment.

An embodiment of a hollow article manufacturing apparatus for manufacturing this hollow article will be described next. A manufacturing apparatus for a tri-port type CV-joint boot (hollow article) for an automobile illustrated in, e.g., FIG. 1 is mentioned as a typical example. Generally dividing the hollow article manufacturing apparatus illustrated in FIG. 1, it is made up of an annular orifice nozzle 30, a drawing unit 6, and a blow mold 11. The manufacturing apparatus of the present invention is constructed so that a nozzle mouthpiece of the annular orifice nozzle 30 is multi-divided and the divided nozzle mouthpiece can reciprocate laterally, and part of the nozzle mouthpiece is replaceable with the blow mold 11. It has a characteristic feature in a relation between such a construction and the drawing unit 6.

The annular orifice nozzle 30 is made up of a nozzle core 1 constituted so as to upwardly and downwardly move, and nozzle mouthpieces 2a, 2b, and 2c concentrically surrounding the nozzle core 1. The nozzle core 1 and the nozzle mouthpiece 2a define an outlet gap 3 in the form of an annular orifice at the upper portion. A thermoplastic resin 4 is supplied to the outlet gap 3 through an annular chamber between the nozzle core 1 and the nozzle mouthpiece 2a. As described above, the nozzle mouthpiece is made up of three parts, i.e., the nozzle mouthpieces 2a, 2b, and 2c (three-divided construction). The nozzle mouthpieces 2a and 2b are vertically fixed and each laterally two-divided so as to be able to open and close. Note that, in this embodiment, although the nozzle mouthpiece is vertically three-divided and laterally two-divided, this is nothing but only one embodiment, and the vertical and lateral division construction is optional. The nozzle mouthpiece 2b has a cavity 17 on the inner circumference for injection-molding the other end portion (the lower end portion in FIG. 1) of the hollow article with the outer circumference of the nozzle core 1. The nozzle core 1 has a size/shape so as to form a desired flow passage between it and the nozzle mouthpieces 2a, 2b, and 2c. On the outer circumferential surface opposite to the cavity 17 of the nozzle mouthpiece 2b, it has a shape corresponding to the inner diameter 41a of the other end portion 41 of the hollow article to be injection-molded, and it is constructed so as to be upwardly and downwardly movable in an axial direction (vertically in FIG. 1) in accordance with an arrow 5 in FIG. 1. The construction of the flow passage is not particularly limited and it can be changed in design within the scope of the present invention at need. In this embodiment, since the other end portion 41 of the hollow article is injection-molded so as to have a configuration in which the wall thickness changes so that the outer diameter 41b is made into an accurate circle and the inner diameter 41a is uneven in height, the inner surface shape of the cavity 17 is made into a shape corresponding to that and the outer circumferential shape of the nozzle core 1 is made into a shape corresponding to the uneven shape of the inner diameter 41a. Note that, if any one or either of the inner and outer diameters 41a and 41b of the other end portion 41 of the hollow article has a shape which can be injection-molded so as to have a construction in which the wall thickness changes multidirectionally, the inner surface shape of the cavity 17 and the outer circumferential shape of the nozzle core 1 should not particularly be limitedly interpreted and they can properly be changed in design within the scope of the present invention. The nozzle mouthpieces 2a and 2b are opened and closed by horizontally reciprocating as shown by arrows 12b and 12c in FIG. 1. In contrast with this, the nozzle core 1 disposed in the interior can be upwardly and downwardly moved in accordance with the arrow 5 in FIG. 1, as described above. That is, by the up/down operation of the nozzle core 1, the width of the outlet gap 3 formed between it and the mouthpiece 2a is controlled to be wide and narrow. By this width control of the outlet gap 3, the parison 18a formed with moving the drawing unit 6 apart from the annular orifice nozzle 30 can be formed into a tubular shape having various different cross sections throughout the whole length (for example, the thickness of the parison wall changes into a wave shape through troughs 36 and peaks 37). Note that the shape of the parison 18a should not particularly be limitedly interpreted and one not having various different cross sections throughout the whole length like this embodiment is also within the scope of the present invention. Although an up/down mechanism for the nozzle core 1 is disclosed in FIG. 1, the construction of this embodiment is nothing but one embodiment and it should not be interpreted limitedly to this, and for example, a driving unit, a stroke measuring device, and a controller constituting the up/down mechanism are also not limited, and another optimum construction can be adopted within the scope of the present invention.

Here, each of the nozzle mouthpieces 2a, 2b, and 2c multi-divided vertically and laterally has an individual independent temperature conditioning system, and it can be adjusted and set at temperatures at which the thermoplastic resin in the nozzle mouthpiece is made easy to flow upon flowing, easy to blow upon blowing, and solidified at a short time. As this temperature conditioning system, a well-known construction can properly be selected within the scope of the present invention, and can be changed in accordance with the thermoplastic resin used. Besides, the nozzle mouthpieces 2a, 2b, and 2c can have heat-insulating structures at the respective contact surfaces, which is within the scope of the present invention. Besides, these heat-insulating structures may also be well-known structures.

The drawing unit 6 is disposed above the annular orifice nozzle 30 to be opposite to the nozzle 30. The drawing unit (hereinafter also referred to as neck mold (injection die)) 6 is constituted so as to be upwardly and downwardly movable in accordance with an arrow 7 in FIG. 1, and it is for injection-molding one end portion (the upper end portion in FIG. 1) 40 of the hollow article and forming a cylindrical parison 18a by drawing up. The neck mold 6 surrounds the front end portion of a blow mandrel 10, and it defines a cavity open downward, in cooperation with the outer circumference of the blow mandrel 10. The open side of the cavity 9 communicates with the outlet gap 3 when the neck mold 6 sits on the annular orifice nozzle 30. The cavity 9 is for injection-molding the one end portion (the upper end portion in FIG. 1) 40 of the hollow article and formed into a shape so that the wall thickness of the one end portion 40 changes multidirectionally with extremely high accuracy. This cavity 9 should not particularly be limitedly interpreted, and it can properly be changed in design within the scope of the present invention. Although an up/down mechanism for the drawing unit 6 is disclosed in FIG. 1, the construction of this embodiment is nothing but one embodiment and it should not be interpreted limitedly to this, and for example, a driving unit, a stroke measuring device, and a controller constituting the up/down mechanism are also not limited, and another optimum construction can be adopted within the scope of the present invention.

As for the blow mold, FIG. 1 only illustrates a blow molding split mold 11 as one part of the blow mold, but both blow molding split molds 11 are horizontally reciprocated as shown by an arrow 12a to open and close (see FIGS. 5(e) to (h)). The blow molding molds define inside a predetermined cavity 13. Although the profile of the cavity 13 should not particularly be interpreted limitedly to the illustrated form, it is formed so as to correspond the hollow article body 8 to be formed by blow molding. For example, in this embodiment, the profile of the cavity 13 must correspond to the outer profile of the hollow article body (bellows) 8 when the blow mold is closed, as illustrated in FIG. 6. Note that the height of the inner surface shape of each blow molding split mold 11 is the sum of the height of the inner surface shape of the nozzle mouthpiece 2a and the height of the parison 18a.

The nozzle mouthpieces 2b and 2c have slanting surfaces 22a and 22b in their upper portions. When both blow molding split molds 11 are closed, the blow molding split molds 11 are put on the slanting surface 22a with a supporting surface 23a slanting correspondingly. The supporting surface 23a is provided on the lower surface of an annexed portion 25a. Similarly, when the divided nozzle mouthpiece 2b is closed, the divided nozzle mouthpiece 2b is put on the slanting surface 22b with a supporting surface 23b slanting correspondingly. The supporting surface 23b is provided on the lower surface of an annexed portion 25b. The annexed portions 25a of both blow molding split molds 11 and the annexed portion 25b of the divided nozzle mouthpiece 2b are advanced toward the slanting surfaces 22a and 22b upon closing, respectively. Although the illustration is omitted, each blow molding split mold 11 and the nozzle mouthpiece 2a can slide along horizontal rails attached on a rack. The rack supports a blow mold operation device made up of two double-acting piston-cylinder units and a nozzle mouthpiece 2a operation device. Each of the double-acting piston-cylinder unit engages with one blow molding split mold 11 and one nozzle mouthpiece 2a. In addition, this rack itself engages with the double-acting piston-cylinder units and slides along horizontal rails so that each blow molding split mold 11 and the nozzle mouthpiece 2a may be replaceable. Further, pressure liquid is supplied through a conduit to any of the double-acting piston-cylinder units. By a similar method, the nozzle mouthpiece 2b also can reciprocate.

Referring to FIG. 1, a platform 43 supports a neck mold driving device 46. The driving device 46 engages with an annexed portion 45 of the neck mold 6 for moving the neck mold 6. Like the blow molding mold operation device and the nozzle mouthpiece operation device as described above, the driving device 46 is also constructed as a piston-cylinder unit. Pressure liquid is supplied to the piston-cylinder unit through a conduit 42. On the other hand, the platform 43 also supports a nozzle core driving device 47. The driving device 47 comprises a piston-cylinder unit and engages with the nozzle core 1. Also to the piston-cylinder unit supplied is pressure liquid through the conduit 42. As described above, the driving devices 46 and 47 are nothing but one embodiment and they are not limitative. In FIG. 1, reference numeral 44 denotes a pressurizing piston. With the pressurizing piston 44, a driving device 48 constructed as a piston-cylinder unit engages. It is used for forcibly sending the thermoplastic resin toward the outlet gap 3. Also, these pressurizing piston 44 and driving device 48 are nothing but one embodiment and they are not limitative. The above conduits 42 are open to oil pressure control valves 50, 51, and 52, respectively. With the oil pressure control valves 50, 51, and 52, not only the flow of the pressure liquid can be stopped, but also the flow rate of the pressure liquid flowing in a unit time can be adjusted or controlled. Each of the oil pressure control valves 50, 51, and 52 is connected with a main conduit 54. The pressure liquid is supplied to the manufacturing apparatus through the main conduit 54. Stroke measuring devices 14, 15, and 16 are disposed for the neck mold 6, the nozzle core 1, and the pressurizing piston 44, respectively. The stroke measuring devices 14, 15, and 16 are only schematically illustrated in FIG. 1. As illustrated in FIG. 2, these stroke measuring devices 14, 15, and 16 send out measurement data to a computer 21. A program set based on specific bellows to be manufactured or a parison to be manufactured accordingly is supplied to the computer from a memory 24. The computer 21 controls the oil pressure control valves 50, 51, and 52 in accordance with the program and the measurement data sent out from the stroke measuring devices. FIG. 3 schematically illustrates a stroke measuring device to be used in three ways, which is constructed as a supersonic stroke receiver. The supersonic stroke receiver includes a movable ring magnet 26 using a permanent magnet. The ring magnet 26 is connected with a movable member, and the movement distance or position of the movable member is measured relatively to the zero point position. The ring magnet 26 is provided with a measuring tube 29. The measuring tube 29 is made of a ferromagnetic material and disposed at a fixed position. The measuring tube 29 is stopped at its one end with a sound-absorbing material 31 and a measuring wire 32 is incorporated therein. To the other end portion of the measuring wire 32, an electric pulse is supplied from an electric pulse transmitter 33. The electric pulse runs along the measuring wire 32 with generating a circular magnetic filed, till the magnetic field reaches the ring magnet 26 and the ring magnet 26 sends out an acoustic pulse. The acoustic pulse is received by the supersonic pulse receiver 34. The time lag between the pulse transmission and the pulse reception is a scale for the current position of the movable member, i.e., the ring magnet 26. Also the stroke measuring devices 14, 15, and 16 and controller are nothing but one embodiment and they are not limitative, as described above.

Next, an embodiment of a manufacturing method will be described with reference to FIGS. 5(a) to (h). In this embodiment, a hollow article is formed through the steps in the order of (a)→(b)→(c)→(d)→(e)→(f)→(g)→(h) illustrated in FIG. 5. The neck mold 6 is first in a state of being moved down for time being, it sits on the central region of the nozzle core 1 with an end portion of the blow mandrel 10, and a thermoplastic resin 4 is injected into the cavity 9 to inject-mold one end portion (also referred to as plastic neck portion) 40 (FIG. 5(a)). The one end portion 40 is formed so as to have a configuration in which the wall thickness changes multidirectionally with extremely high accuracy, because it is formed by injection molding. When the neck mold 6 is moved upward with further extruding the thermoplastic resin through the outlet gap 3, a cylindrical parison 18a is drawn and formed (FIGS. 5(b) and (c)). This parison manufacture start point 19 is the time point when the neck mold 6 sits downward on the annular orifice nozzle 30 (as illustrated in FIG. 1). The parison manufacture end point 20 is the time point when the neck mold 6 occupies the upper limit position illustrated in FIG. 1 (a state of FIG. 1 and FIG. 5(d)). Besides, at this time, the nozzle core 5 can axially reciprocate as shown by the arrow 5. It advances upon the completion of the parison manufacture to come into contact with the most front edge of the nozzle mouthpiece 2c, where a product portion and a molten resin portion are separated. Since the other end portion 41 is injection-molded in the cavity 17 of the nozzle mouthpiece 2b, the other end portion 41 is formed so as to have a configuration in which the wall thickness changes multidirectionally with extremely high accuracy. Next, both nozzle mouthpieces 2a are moved in, e.g., X-Y directions so that they may not interfere with both blow molding split molds 11 (FIG. 5(d)). After this, both blow molding split molds 11 are moved to close (FIGS. 5(e) and (f)). Compressed gas is supplied through the blow mandrel 10, and the parison 18a and the parison 18b are blow-molded into the final shape within the blow molding split molds 11 to form a hollow article body 8 and become a continuous one body with the other end portion 41 (FIG. 5(g)). Since the cylindrical parisons 18a and 18b are never flatly compressed, the plastic is extended evenly throughout the whole periphery. As a result, the generated waste portion becomes less than in case of an extrusion-blow molding. The nozzle mouthpiece 2b is moved to open at the same time when both blow molding split molds 11 are moved to open, and the product in the upper portion than the front end of the nozzle mouthpiece 2c is drawn up by the neck mold 6 (FIG. 5(h)). The parison 18 has, e.g., six wall section thick portions 35 distributed over the whole length. Each wall section thick portion 35 extends from one trough 36 through one peak 37 to the next trough 36 and it gives the wall cross section a wave shape as a whole. As illustrated in FIG. 4, the hollow article body (bellows) 8 manufactured from the parison 18a has specific crest portions 38 separated by specific isthmus portions 39. Therefore, the hollow article body (bellows) 8 has at its both ends one end portion 40 and the other end portion 41 each having a configuration in which the wall thickness changes multidirectionally with extremely high accuracy.

Since the present invention is constructed as described above, it can provide a hollow article having a configuration in which the wall thickness of each of both end portions changes multidirectionally with extremely high accuracy, and an apparatus and method for manufacturing the hollow article. Therefore, the provision of a hollow article having both ends whose wall thickness changes multidirectionally with high accuracy, e.g., a tri-port type CV-joint boot for an automobile, which the prior art (e.g., Japanese Patent No. 2556647 and so on) never could achieve, can be intended accurately and surely. Besides, according to the manufacturing method and apparatus of the present invention, the unnecessary molded portion from the distal end of the nozzle mouthpiece to the other end portion of the CV-joint boot becomes little, and there is an advantage that the amount of waste generated becomes very little. Besides, since the nozzle mouthpiece multi-divided vertically and laterally is provided with an individual independent temperature conditioning system, it can be adjusted and set at temperatures at which a thermoplastic resin in the nozzle mouthpiece is made easy to flow upon flowing, easy to blow upon blowing, and solidified at a short time.

What is claimed is:

1. A manufacturing apparatus of a hollow article comprising:

an annular orifice nozzle made up of a nozzle core constituted so as to be upwardly and downwardly movable, and a nozzle mouthpiece concentrically surrounding said core to form an outlet gap having a variable gap width for upward extruding a thermoplastic resin between it and said core;

a drawing unit having a cavity of a desired shape downward opened for forming one end portion of a hollow article, said drawing unit being moved apart from said annular orifice nozzle to draw and form a tubular parison after injecting the thermoplastic resin into said cavity on said outlet gap of said annular orifice nozzle; and a blow mold for blow-molding said tubular parison to form a hollow article body of a desired shape, wherein said nozzle mouthpiece is multi-divided vertically and laterally, each divided part is disposed so as to be able to reciprocate laterally, an uppermost portion of said nozzle mouthpiece divided is constituted so as to be replaceable with said blow mold upon blow molding, and a lower portion of said nozzle mouthpiece has a desired cavity and can be moved laterally upon taking out a product after forming the other end portion of the hollow article into a desired shape to open them.

2. The manufacturing apparatus of the hollow article according to claim 1, wherein said nozzle mouthpiece is divided into at least a portion for forming the outlet gap, and a portion for injection-molding the other end portion of the hollow article having a configuration in which a wall thickness changes multidirectionally with extremely high accuracy.

3. The manufacturing apparatus of the hollow article according to claim 1, wherein said nozzle mouthpiece multi-divided vertically and laterally can have an individual independent temperature conditioning system to set the thermoplastic resin in the nozzle mouthpiece at a proper temperature any time.

* * * * *